(12) United States Patent
Wood et al.

(10) Patent No.: US 7,641,146 B2
(45) Date of Patent: Jan. 5, 2010

(54) AIRCRAFT NOSE LANDING GEAR ENCLOSURE

(75) Inventors: Jeffrey H. Wood, Eureka, MO (US);
Lamvien H. Ngo, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 116 days.

(21) Appl. No.: 11/860,345

(22) Filed: Sep. 24, 2007

(65) Prior Publication Data

US 2009/0078823 A1   Mar. 26, 2009

(51) Int. Cl.
*B64C 1/00* (2006.01)
(52) U.S. Cl. ............ 244/119; 244/100 R; 244/102 R; 244/104 FP; 244/117 R; 244/50; 244/129.1; 244/129.4; 244/120
(58) Field of Classification Search ............ 244/100 R, 244/102 R, 104 FP, 117 R, 119, 120, 129.1, 244/129.4, 50
See application file for complete search history.

(56) References Cited

U.S. PATENT DOCUMENTS

| 2,280,185 | A | * | 4/1942 | Bridges ............... 244/102 SL |
| 3,335,981 | A | | 8/1967 | Pauli et al |
| 3,653,615 | A | * | 4/1972 | Spence .................... 244/137.1 |
| 4,228,975 | A | * | 10/1980 | Sealey ..................... 244/102 R |
| 4,408,736 | A | * | 10/1983 | Kirschbaum et al. .... 244/100 R |
| 4,568,045 | A | * | 2/1986 | Mayer ..................... 244/102 R |
| 4,674,712 | A | * | 6/1987 | Whitener et al. ............. 244/119 |
| 5,435,504 | A | * | 7/1995 | Inoue et al. .................... 244/13 |
| 5,482,228 | A | | 1/1996 | Hoshino |
| 6,010,286 | A | * | 1/2000 | Cross et al. ................. 410/129 |
| 6,213,428 | B1 | * | 4/2001 | Chaumel et al. ............ 244/119 |
| 6,273,364 | B1 | | 8/2001 | Tizac et al. |
| 6,464,168 | B1 | * | 10/2002 | Swannell et al. ........ 244/102 A |
| 6,834,833 | B2 | * | 12/2004 | Sankrithi ..................... 244/119 |
| 2007/0210211 | A1 | * | 9/2007 | Grob .......................... 244/119 |
| 2007/0246613 | A1 | * | 10/2007 | Kennedy ..................... 248/56 |

* cited by examiner

*Primary Examiner*—Michael R Mansen
*Assistant Examiner*—Justin Benedik
(74) *Attorney, Agent, or Firm*—Rozenblat IP LLC

(57) ABSTRACT

In one embodiment, an aircraft comprises a plurality of hoop frame support members and a landing gear enclosure comprising a curved surface. The plurality of support frame support members abut against and extend over the curved surface to provide support to the landing gear enclosure. In another embodiment, loads are transferred from a landing gear strut through a strut fitting, through at least one inner surface of the landing gear enclosure, through at least one outer surface of the landing gear enclosure, and into the plurality of hoop frame support members.

19 Claims, 6 Drawing Sheets

FIG. 6 shows a flowchart of one embodiment of a method of transferring loads in an aircraft.

AIRCRAFT NOSE LANDING GEAR ENCLOSURE

BACKGROUND

Existing aircraft fuselages are typically aluminum and employ built-up structures that rivet thin gauge aluminum skins to aluminum substructure such as frames, stringers, and longerons. The nose landing gear enclosures of these aircraft typically comprise rectangular aluminum wheel well enclosures with flat sides at which hoop frames around the fuselage barrel terminate. These landing gear enclosures, often carry both pressure and landing gear loads which are distributed into the aircraft fuselage. As a result, these enclosures may need to be robustly stiffened with stiffening members to carry the loads through the enclosures into the fuselage. This may result in increased part counts, increased weight, increased complexity, and increased cost. It may also lead to one or more other types of problems. Moreover, these types of enclosures may not be applicable to composite aircraft.

A landing gear enclosure system, and/or a method of use, installation, and/or load transfer in a landing gear enclosure, is needed to decrease one or more problems associated with one or more of the existing landing gear enclosures and/or methods of use, installation, and/or load transfer.

SUMMARY

In one aspect of the disclosure, an aircraft comprises a plurality of hoop frame support members and a landing gear enclosure comprising a curved surface. The plurality of hoop frame support members abut against and extend over the curved surface to provide support to the landing gear enclosure.

In another aspect of the disclosure, a landing gear enclosure comprises a dome-shaped surface for being abutted against and under a plurality of hoop frame support members of an aircraft.

In yet another aspect of the disclosure, an aircraft comprises a landing gear enclosure which comprises an un-pressurized inner cavity and an outer surface which is pressurized at a pressure higher than the un-pressurized inner cavity to provide a pressure differential. At least one inner surface of the landing gear enclosure is compressed against at least one surface of at least one of a frame support member and a fitting member as a result of the pressure differential.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
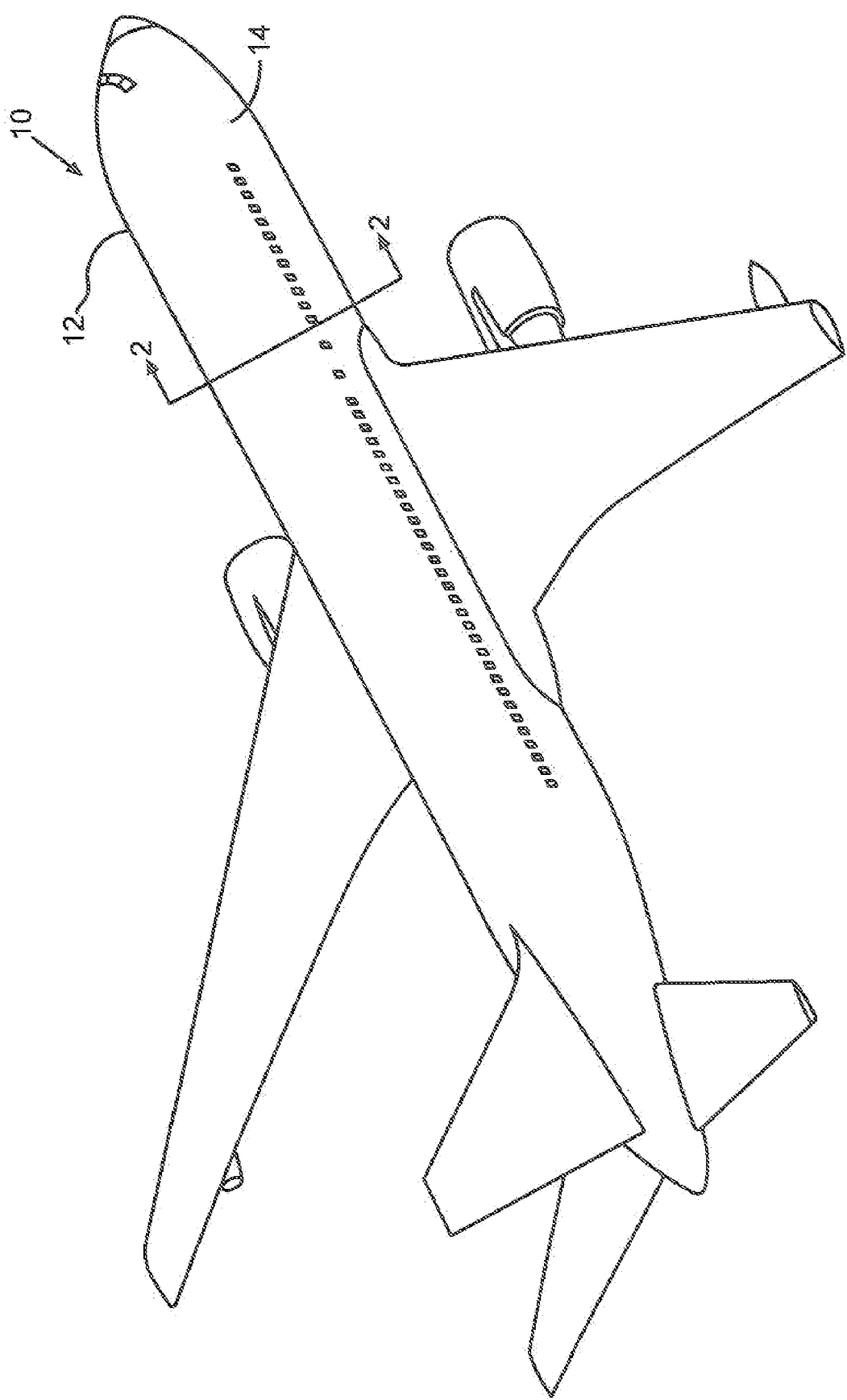
FIG. 1 shows a perspective view of one embodiment of an aircraft.
Figure 2:
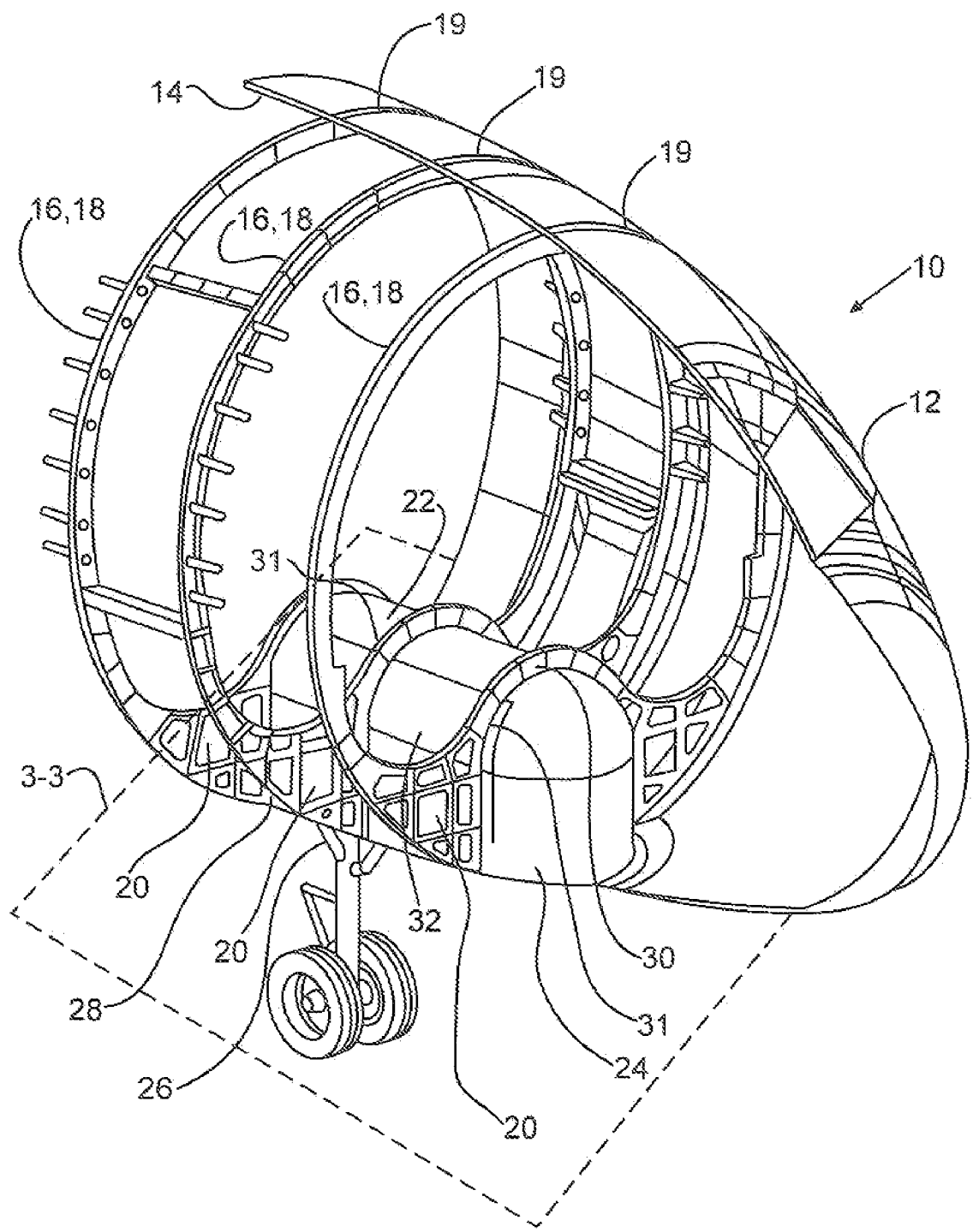
FIG. 2 shows a perspective partial cross-section view through line 2-2 of the embodiment of FIG. 1 with one side of the composite fuselage cut away.

FIG. 1 shows a perspective view of one embodiment of an aircraft 10. The aircraft 10 may have a composite fuselage 12. FIG. 2 shows a perspective partial cross-section view through line 2-2 of the embodiment of FIG. 1 with one side 14 of the composite fuselage 12 cut away. As shown, a plurality of hoop frame support members 16 may be disposed in parallel, spaced apart formation within the composite fuselage 12. The hoop frame support members 16 may each form continuous loops 18 around the composite fuselage 12 which are adapted to carry all of the fuselage loads of the aircraft 10. Each hoop frame support member 16 may be attached to the fuselage 12 utilizing bolts 19, or other attachment mechanisms. The hoop frame support members 16 may be made of Titanium or Aluminum and may each be defined by a plurality of openings 20 through which aircraft components such as electrical lines, plumbing lines, etc. may be run.

The hoop frame support members 16 may extend over, around, and abut against a top curved surface 22 of a landing gear enclosure 24 in a saddle shaped manner in order to carry all fuselage loads of the aircraft 10 independently from the landing gear enclosure 24. The landing gear enclosure 24 may be made of a metal, a composite, or other material. In the embodiment shown, three hoop frame support members 16 abut against, around, and extend over the landing gear enclosure 24. In other embodiments, a varying number of hoop frame support members 16 may be utilized. The landing gear enclosure 24 may be dome-shaped and have the appearance of a dog-house comprising the top curved surface 22 and substantially straight side-surfaces 26. Substantially straight side-portions 28 of each hoop frame support member 16 may be aligned along and abut against the substantially straight side-surfaces 26 of the landing gear enclosure 24. The hoop frame support members 16 may be attached to the curved top surface 22 and/or the substantially straight side-surfaces 26 of the landing gear enclosure 24 utilizing bolts 30, or other attachment mechanisms. In such manner, the plurality of hoop frame support members 16 may provide support to the landing gear enclosure 24. In other embodiments, the landing gear enclosure 24 and the hoop frame support members 16 may be in a variety of materials, shapes, sizes, orientations, and configurations.

Figure 3:
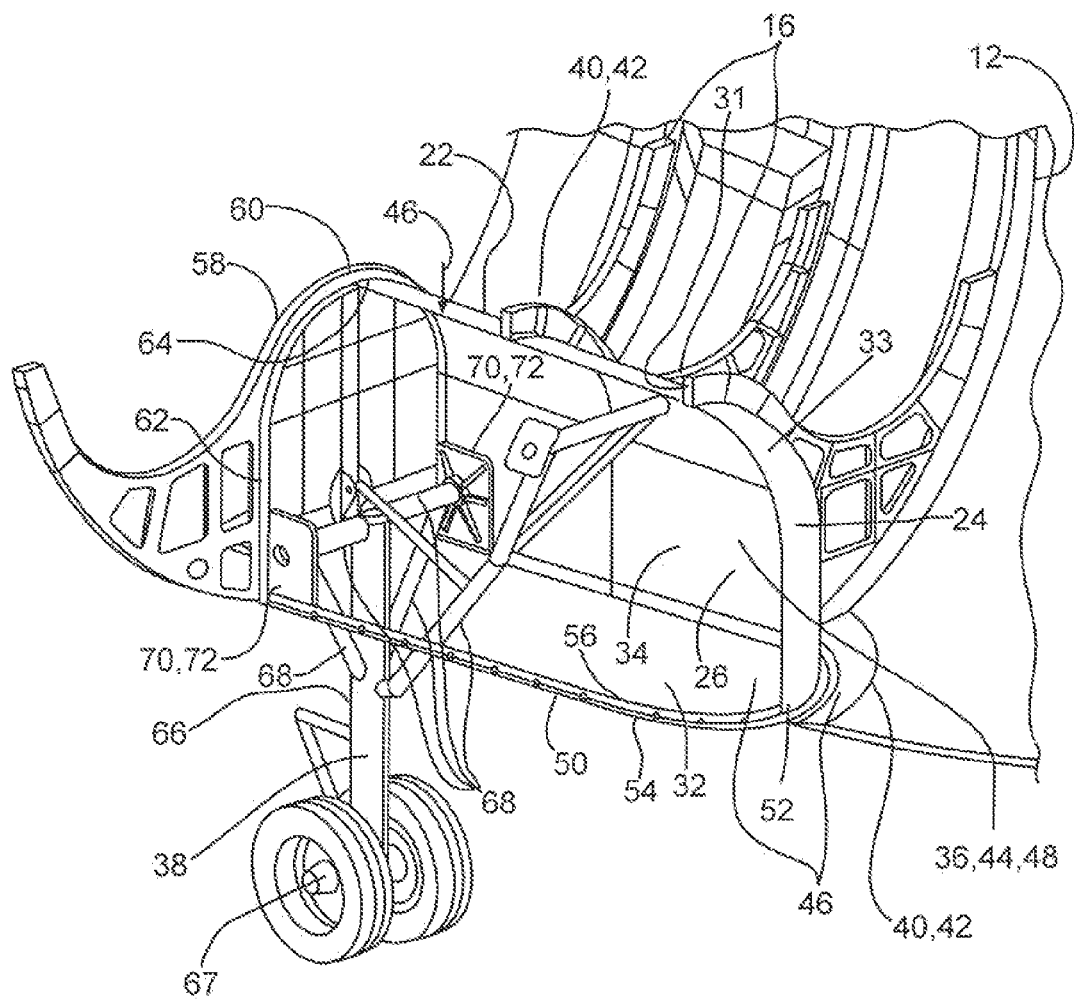
FIG. 3 shows a perspective, partial, close-up view within rectangle 3-3 of the embodiment of FIG. 2 with one side of the landing gear enclosure cut away and one side of some of the hoop frame support members cut away.

FIG. 3 shows a perspective, partial, close-up view within rectangle 3-3 of FIG. 2 with one side 32 of the landing gear enclosure 24 cut away and one side 31 of some of the hoop frame support members 16 cut away. As shown, the landing gear enclosure 24 may comprise an outer surface 33 and an inner surface 34 which defines a cavity 36 housing landing gear 38. The outer area 40 outside the outer surface 33 of the cavity 36 and inside the aircraft fuselage 12 may be pressurized to a higher pressure 42 than the un-pressurized pressure 44 within the inner surface 34 of the cavity 36 of the landing gear enclosure 24. In such manner, the curved surface 22 and substantially straight side surfaces 26 of the landing gear enclosure 24 may have a pressure differential 46 across them.

The pressure differential 46 may be pushing the curved surface 22 and the substantially straight side surfaces 26 of the landing gear enclosure 24 towards the inner portion 48 of the cavity 36. A curved, angled fitting 50 which is attached to the fuselage 12 may extend around a bottom peripheral edge 52 of the landing gear enclosure 24. The fitting 50 may have a horizontal base portion 54 and a vertical leg portion 56. The pressure differential 46 may compress the inner surface 34 of the bottom peripheral edge 52 of the landing gear enclosure 24 against the vertical leg portion 56 of the fitting 50 to prevent the landing gear enclosure 24 from collapsing due to the pressure differential 46.

The aft hoop frame support member 58 may include a vertical, curved wall 60 which contains a protruding ledge 62. The pressure differential 46 may compress the inner surface 34 of the side peripheral edge 64 of the landing gear enclosure 24 against the protruding ledge 62 to further prevent the landing gear enclosure 24 from collapsing due to the pressure differential 46.

The landing gear 38 may be adapted to extend out of and retract into the cavity 36 of the landing gear enclosure 24. The landing gear 38 may comprise a landing gear strut 66 attached to a wheel axel 67. The landing gear strut may comprise a plurality of arm members 68. Strut fittings 70 may be attached to separate arm members 68 of the landing gear strut 66. The strut fittings 70 may each comprise a substantially straight surface 72. The substantially straight surface 72 of the strut fittings 70 may abut against the inner surface 34 of the cavity 36 of the landing gear enclosure 24.

Figure 4:
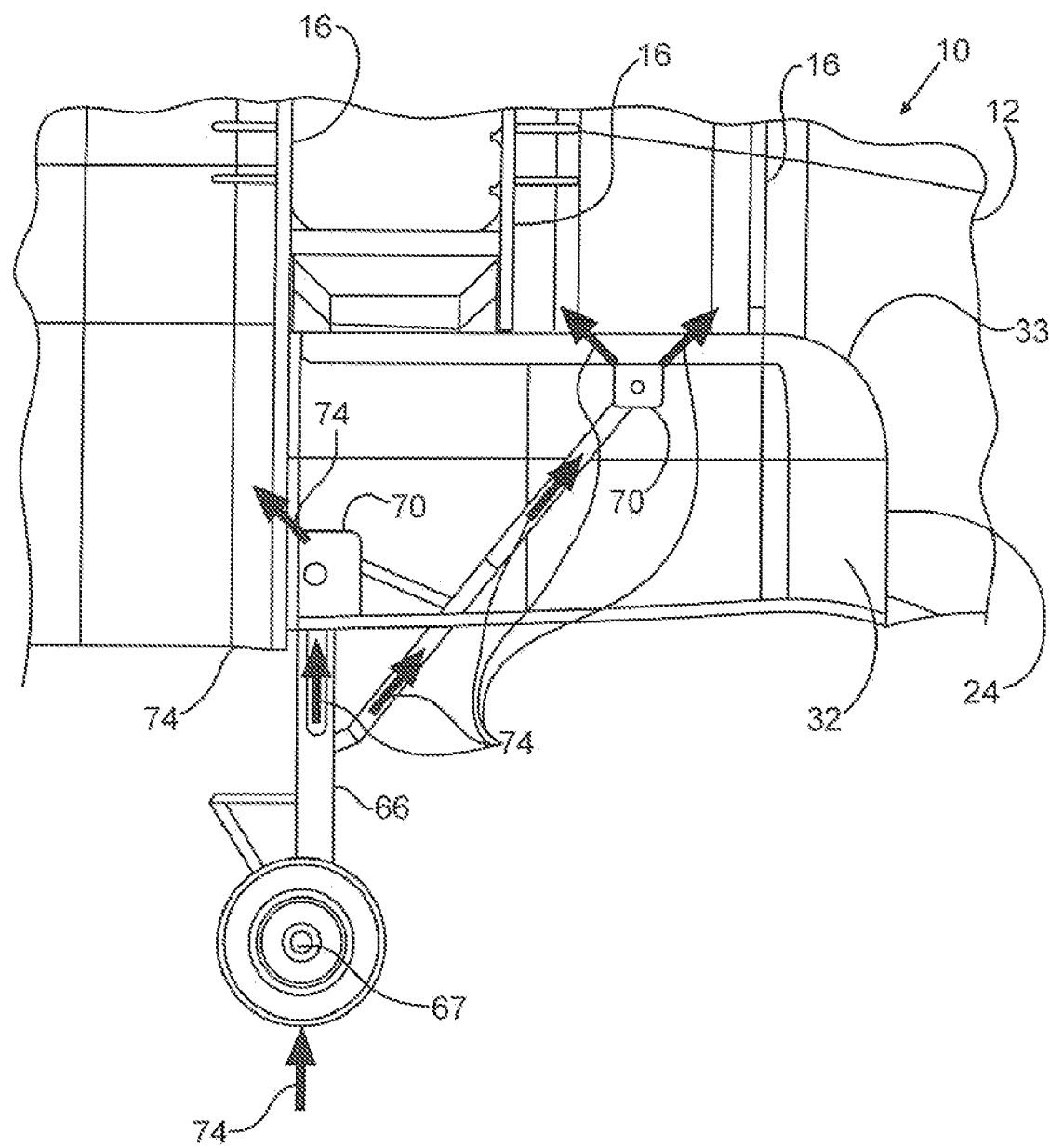
FIG. 4 shows a partial side-view of the embodiment of FIG. 3 showing the load distribution from the landing gear strut through the landing gear enclosure and into the fuselage.

FIG. 4 shows a partial side-view of the embodiment of FIG. 3 showing the load distribution from the landing gear strut 66 through the enclosure 24 and into the fuselage 12. As shown in FIG. 4, loads 74 from the landing gear strut 66 may transfer through the strut fittings 70, through the inner surface 32 of the landing gear enclosure 24, through the outer surface 33 of the landing gear enclosure 24, into the plurality of hoop frame support members 16, and into the fuselage 12 of the aircraft 10. In such manner, the loads 74 from the landing gear strut 66 may be transferred into the fuselage 12 without collapsing the landing gear enclosure 24.

Figure 5:
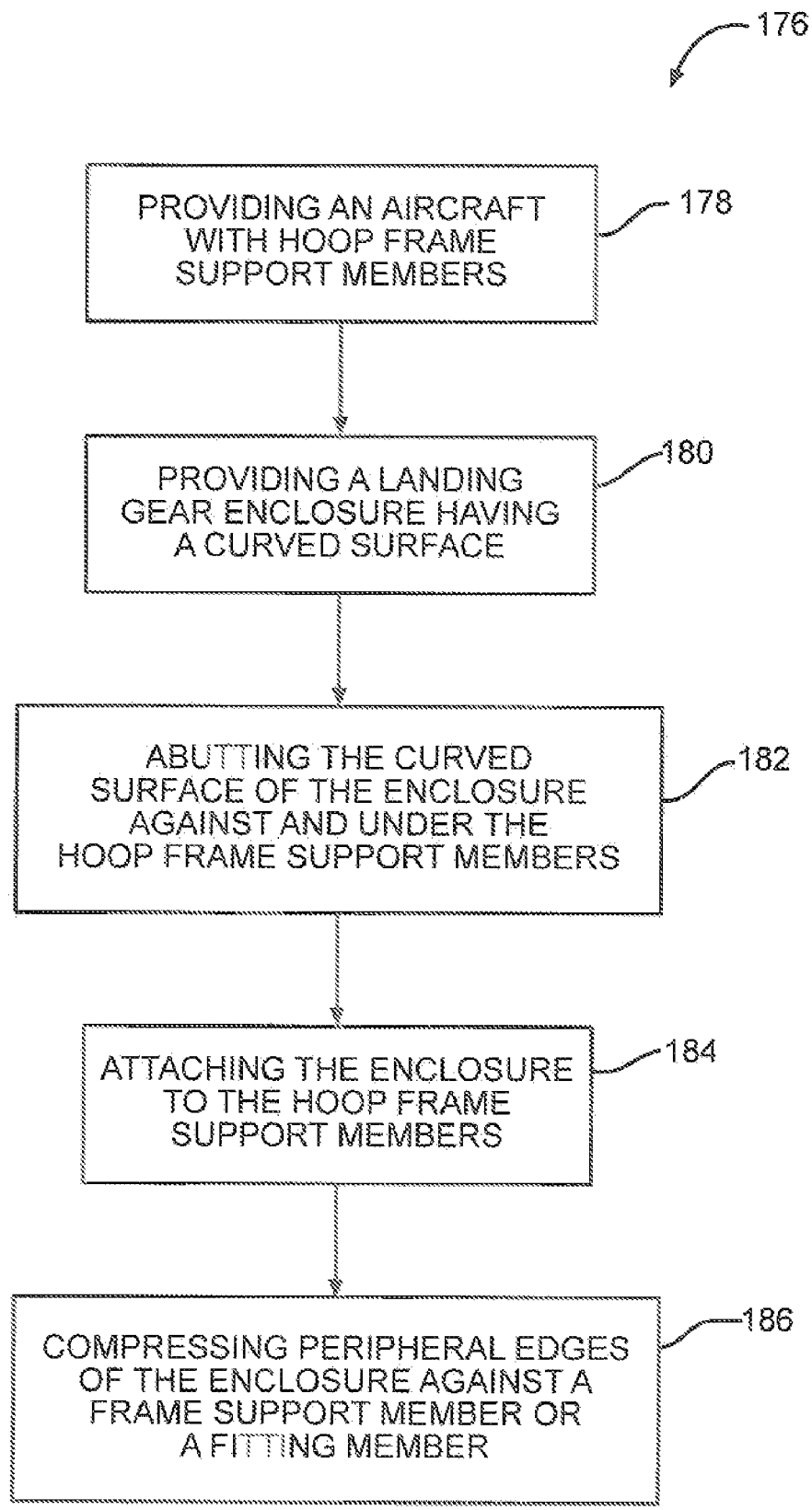
FIG. 5 shows a flowchart of one embodiment of a method of installing a landing gear enclosure in an aircraft.

FIG. 5 shows a flowchart of one embodiment of a method 176 of installing a landing gear enclosure 24 in an aircraft 10, which may be made of a composite. In one step 178, an aircraft 10 may be provided comprising a plurality of hoop frame support members 16. The hoop frame support members 16 may form continuous loops 18 around the aircraft fuselage 12 which carry ail of the fuselage loads of the aircraft 10. In another step 180, a landing gear enclosure 24 may be provided comprising a curved surface 22. The landing gear enclosure 24 may be dome-shaped. In yet another step 182, the curved surface 22 of the landing gear enclosure 24 may be abutted against and under at least a portion of the plurality of hoop frame support members 16.

In another step 184, the landing gear enclosure 24 may be attached to the hoop frame support members 16. The plurality of hoop frame support members 16 may support the curved surface 22 of the landing gear enclosure 24 so that ail fuselage loads of the aircraft are carried by the hoop frame support members 16 independently from the landing gear enclosure 24. In still another step 186, peripheral edges 52 and 64 of the landing gear enclosure 24 may be compressed against at least one of a surface 62 of a frame support member 58 and a surface 56 of a fitting member 50. The compressing step 186 may be caused by a pressure differential 46 on the landing gear enclosure 24.

Figure 6:
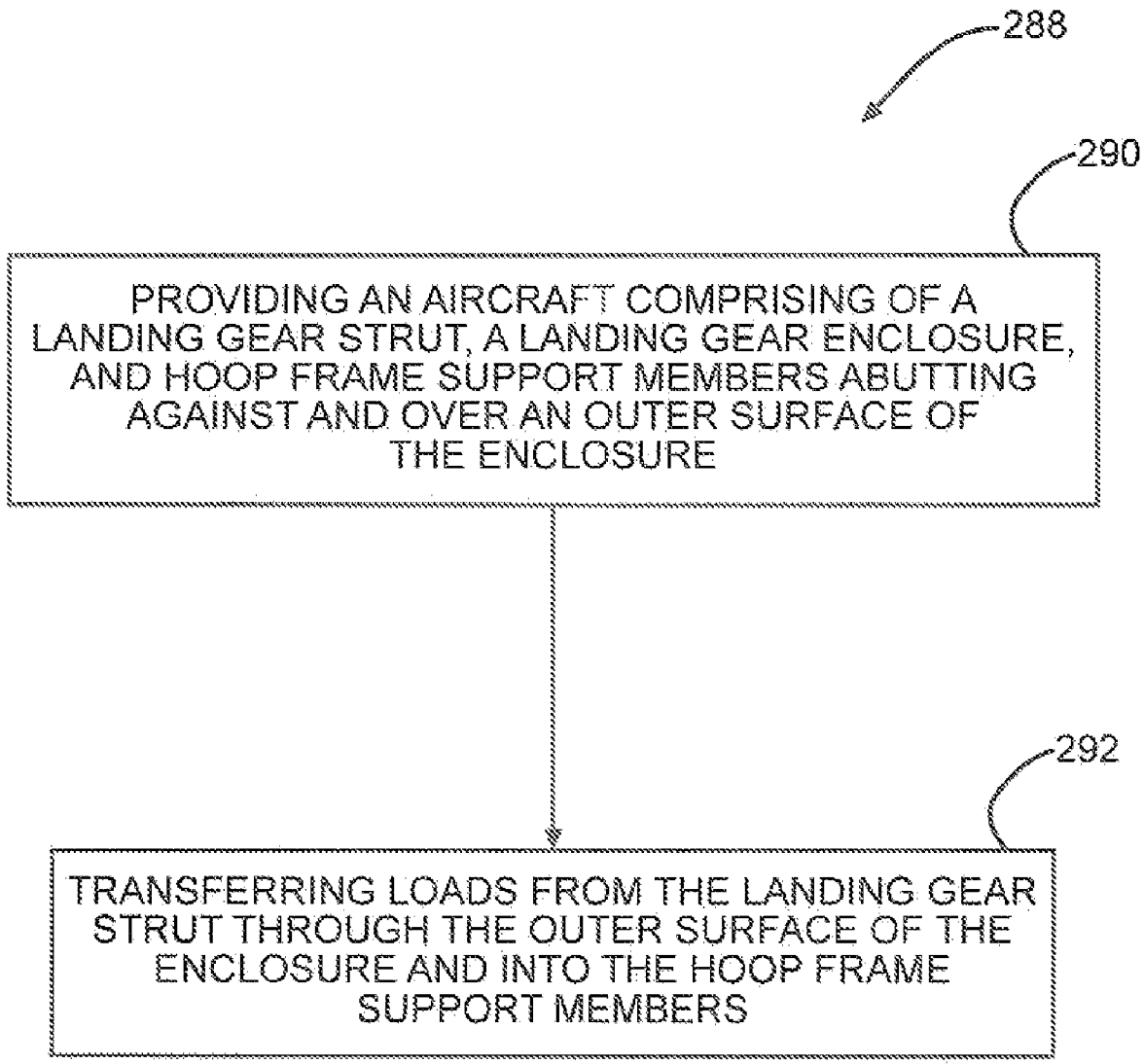

FIG. 6 shows a flowchart of one embodiment of a method 288 of transferring loads 74 in an aircraft 10, which may be made of a composite. In one step 290, an aircraft 10 may be provided comprising a landing gear strut 66, a landing gear enclosure 24, and a plurality of hoop frame support members 16 abutting against and extending over at least one outer surface 33 of the landing gear enclosure 24. The landing gear enclosure 224 may be dome-shaped, and the outer surface 33 of the landing gear enclosure 24 may be curved. The landing gear enclosure 24 may comprise a top curved surface 22 and substantially straight side surfaces 26. The plurality of hoop frame support members 16 may form continuous loops 18 around a fuselage 12 of the aircraft 10. The continuous hoop frame support members 16 may carry all of the fuselage loads of the aircraft 10 independently from the landing gear enclosure 24. The landing gear strut 66 may be attached to a wheel axel 67. Peripheral edges 52 and 64 of the landing gear enclosure 24 may be compressed against at least one of a surface 62 of a frame support member 58 and a surface 56 of a fitting member 50. The compression may be due to a pressure differential 46 on the landing gear enclosure 24.

The aircraft 10 may further comprise a strut fitting 70 attached to the landing gear strut 66. The landing gear strut 66 may comprise a plurality of arm members 68 which are attached to separate strut fittings 70. The strut fittings 70 may abut against at least one inner surface 34 of the landing gear enclosure 24. In another step 292, loads 74 from the landing gear strut 66 may be transferred through the at least one outer surface 33 of the landing gear enclosure 24 and into the plurality of hoop frame support members 16. The transferring step 292 may further comprise transferring the loads 74 from the landing gear strut 66 through the strut fitting 70, through the at least one inner surface 34 of the landing gear enclosure 24, through the at least one outer surface 33 of the landing gear enclosure 24, and into the plurality of hoop frame support members 16. The loads 74 may be from landing of the aircraft 10. The at least one inner surface 34 of the landing gear enclosure 24 may comprise an inner surface of a cavity 36 of the landing gear enclosure 24.

One or more embodiments of the disclosure may reduce and/or eliminate one or more problems of one or more of the existing landing gear enclosures and/or methods of installation, use and/or load distribution. For instance, one or more embodiments of the disclosure may reduce aircraft weight, may reduce cost, may increase strength, may contain less parts, may be made more efficiently in a less complex manner, may provide improved load distribution, and/or may reduce one or more other problems of one or more of the existing landing gear enclosures and/or methods.

It should be understood, of course, that the foregoing relates to exemplary embodiments of the disclosure and that modifications may be made without departing from the spirit and scope of the disclosure as set forth in the following claims.

The invention claimed is:

1. An aircraft comprising a plurality of spaced-apart hoop frame support members, each hoop frame support member forming a loop extending within a pressurized fuselage, the landing gear enclosure comprising substantially straight side-surfaces and a concave dome top curved surface extending away from the substantially straight side-surfaces, the substantially straight side-surfaces and the concave dome top curved defining an unpressurized cavity within the landing gear enclosure for housing retracted landing gear within the fuselage, wherein the plurality of spaced-apart hoop frame support members abut against and extend over and around the cavity, the substantially straight side-surfaces, and the concave dome top curved surface of the landing gear enclosure to provide support to the landing gear enclosure.

2. The aircraft of claim 1 wherein the plurality of hoop frame support members are made of at least one of Titanium and Aluminum.

3. The aircraft of claim 1 wherein each of the plurality of hoop frame support members forms a continuous loop and carry fuselage loads of the aircraft independently from the landing gear enclosure.

4. The aircraft of claim 1 wherein the plurality of hoop frame support members are defined by holes to run electrical components through.

5. The aircraft of claim 1 wherein three hoop frame support members abut against and extend over and around the side-surfaces and the top curved surface of the landing gear enclosure.

6. The aircraft of claim 1 wherein the aircraft is made of a composite.

7. The aircraft of claim 1 wherein at least one inner surface of the landing gear enclosure is compressed against at least one of a surface of at least one of the hoop frame support members and a fitting member as a result of a pressure differential.

8. The aircraft of claim 7 wherein peripheral edges of the landing gear enclosure are compressed against the surface of the at least one hoop frame support member and the fitting member as a result of the pressure differential.

9. The aircraft of claim 1 wherein the landing gear enclosure is made of composite materials.

10. A landing gear enclosure comprising a concave dome-shaped top curved surface extending away from substantially straight side-surfaces, the concave dome-shaped top curved surface and the substantially straight side-surfaces defining an unpressurized cavity within the landing gear enclosure for housing retracted landing gear within a pressurized fuselage of an aircraft, the concave dome-shaped top curved surface and the substantially straight side-surfaces each being abutted against and under a plurality of hoop frame support members, extending within the pressurized fuselage of an aircraft, in order to provide support to the landing gear enclosure.

11. The landing gear enclosure of claim 10 wherein the dome-shaped, top curved surface is supported by the plurality of hoop frame support members of a composite aircraft which independently carry fuselage loads independently from the landing gear enclosure.

12. The landing gear enclosure of claim 10 wherein peripheral edges of the landing gear enclosure are compressed against at least one of the hoop frame support members and a fitting member as a result of a pressure differential.

13. The landing gear enclosure of claim 10 wherein the landing gear enclosure is made of composite materials.

14. A method of installing a landing gear enclosure in an aircraft comprising:
  providing an aircraft comprising a plurality of hoop frame support members forming loops within a pressurized fuselage of the aircraft;
  providing a landing gear enclosure comprising substantially straight side-surfaces and a concave dome top curved surface extending away from the substantially straight side-surfaces, the substantially straight side-surfaces and the concave dome top curved surface defining an unpressurized cavity; and
  abutting the substantially straight side-surfaces and the concave dome top curved surface of the landing gear enclosure against and under the plurality of hoop frame support members in order to support the landing gear enclosure.

15. The method of claim 14 wherein the hoop frame support members form continuous loops and carry fuselage loads of the aircraft independently from the landing gear enclosure.

16. The method of claim 14 wherein the aircraft is made of a composite.

17. The method of claim 14 further comprising the step of compressing peripheral edges of the landing gear enclosure against at least one of a surface of one of the hoop frame support members and a surface of a fitting member.

18. The method of claim 17 wherein the compressing step is caused by a pressure differential on the landing gear enclosure.

19. The method of claim 14 wherein the landing gear enclosure is made of composite materials.

* * * * *